United States Patent

Kawamoto et al.

[11] Patent Number: 5,927,139
[45] Date of Patent: Jul. 27, 1999

[54] OIL LEAKAGE PREVENTIVE DEVICE FOR TRANSFER FEEDER

[75] Inventors: Kiichirou Kawamoto; Takashi Moriyasu, both of Ishikawa, Japan

[73] Assignee: Komatsu Ltd., Tokyo, Japan

[21] Appl. No.: 09/101,578

[22] PCT Filed: Feb. 27, 1997

[86] PCT No.: PCT/JP97/00592

§ 371 Date: Jul. 9, 1998

§ 102(e) Date: Jul. 9, 1998

[87] PCT Pub. No.: WO97/31729

PCT Pub. Date: Sep. 4, 1997

[30] Foreign Application Priority Data

Mar. 1, 1996 [JP] Japan ........................... 8-44461

[51] Int. Cl.⁶ ................................................. B21D 43/05
[52] U.S. Cl. ............................ 72/405.11; 72/405.01; 198/621.3; 74/53
[58] Field of Search .............. 72/405.01, 405.09–405.16, 72/452.5; 198/621.3; 74/53, 569

[56] References Cited

U.S. PATENT DOCUMENTS

| | | | |
|---|---|---|---|
| 4,811,834 | 3/1989 | Asano | 72/405.13 |
| 5,001,921 | 3/1991 | Schneider | 72/405.13 |

FOREIGN PATENT DOCUMENTS

| | | | |
|---|---|---|---|
| 365026 | 4/1990 | European Pat. Off. | 72/405.01 |
| 394723 | 10/1990 | European Pat. Off. | 72/405.01 |
| 2-104127 | 8/1990 | Japan . | |
| 4-432 | 1/1992 | Japan . | |
| 6-218458 | 8/1994 | Japan . | |
| 6-218459 | 8/1994 | Japan . | |

*Primary Examiner*—Daniel C. Crane
*Attorney, Agent, or Firm*—Frishauf, Holtz, Goodman, Langer & Chick, P.C.

[57] ABSTRACT

There is disclosed a hydraulic leakage proof apparatus for a transfer feeder in which a cam box (7a) containing a cam (8a) and a lever (9) that is oscillated by the cam is placed on or above a press machine (1). The cam box (7a) is formed through its bottom with an elongate opening (7b) through which the lever (9) may pass by a lower end side thereof. The apparatus includes a lower movable cover (16) operatively coupled to the lever (9) and facing downwards so as to cover the elongate opening (7b) while being displaced as the lever (9) is oscillated. The lower movable cover (16) has a lever through-going opening (16b) formed therein through which the lever (9) may pass. The apparatus further includes a cover member (22) facing downwards so as to cover the lever through-going opening (16b), and a gate plate (14) arranged on the bottom of the cam box (7a) and formed with a rising portion (14a) along an inner peripheral edge of the elongate opening (7b).

4 Claims, 5 Drawing Sheets

OIL LEAKAGE PREVENTIVE DEVICE FOR TRANSFER FEEDER

This application is a 371 of PCT/JP97/00592, filed Feb. 27, 1997.

TECHNICAL FIELD

The present invention relates to a hydraulic leakage proof apparatus for use in a transfer feeder, as may be equipped in a transfer press.

BACKGROUND ART

A transfer press typically includes a series of work stations in a press machine body which are operable to press form a workpiece sequentially.

Also provided in the press machine body is a transfer feeder that is designed to successively carry a workpiece from one of these work stations to another.

Such a transfer feeder includes a pair of transfer bars or lift beams arranged in parallel and extending in a workpiece transfer direction in which a finger means secured to the transfer bars or a cross bar means secured to the lift beams via the cross bar carriers serves to hold a workpiece which is sequentially transferred to these work stations as the transfer bar or the lift beam pair is driven to move two- or three-dimensionally.

On the other hand, the transfer feeder referred to above may be implemented in a form in which an operating mechanism such as for a feed, lift and clamp function can be driven with a power taken from the press machine proper.

Such mechanisms are typically installed at a site on upstream or at a floor side downstream of the press machine. Where these mechanisms are located at the floor or bed side, an inconvenience has hitherto been met that they may cause a trouble in installing a work carrying in unit for conveying a workpiece into the press machine or installing a work carrying out unit for conveying a workpiece out of the press machine.

In an attempt to remove such an inconvenience, a modification in the transfer feeder has been proposed, as disclosed, for example, in Japanese Unexamined Patent Publication Nos. Hei 6-218458 and 6-218459, in which a feed mechanism or a lift mechanism is placed on or above the press machine.

In a transfer feeder as described in these patent publications, the lift beams are vertically driven by a lift mechanism with a servo motor as a drive source, a feed mechanism which comprises a feed cam rotatable by a power taken from the press machine and the feed lever adapted to be oscillated by such a feed cam is set up at a site upstream of the press machine body and the feed mechanism is operated to drive a cross bar carrier assembly supported on the lift beams in a feed direction.

Also, in a transfer feeder as described in the above identified patent publications, a feed cam and a feed lever of the feed mechanism are accommodated in a cam box that is installed at a site upstreams of the press machine body, and the upper end side of the feed lever is supported by a shaft in the cam box whereas the lower end side of the feed lever is allowed to project downwards of the cam box, through an elongate opening formed in a lower wall of the cam box and elongated in the feed direction. And, the lower of the feed lever and the cross bar carrier that is located at an uppermost stream side are coupled together.

It should be noted at this point that in such a conventional transfer feeder as just referred to above, a portion of the lubricating system in a press machine is piped locally in such a cam box of the feed mechanism, and various bearing or sliding parts such as a cam shaft and shaft bearing parts, and sliding parts of a cam follower which are attached to a feed cam and a feed lever are thereby lubricated. And, the lubricating oil that flows down from the bearing and sliding parts is allowed to collect in an oil pan mechanism provided on the bottom of the cam box, and thereafter is returned to the lubricating system.

The cam box is commonly formed through its bottom wall with an elongate opening that is required to allow the feed lever to oscillate. Because of such a construction, a portion of the oil is allowed to flow down from the bearing and sliding parts in the cam box and then to fall on a workpiece being introduced into the press machine body, tending to hinder an operation required and to contaminate the workpiece, an inconvenience produced.

It is accordingly an object of the present invention to eliminate such an inconvenience encountered in the prior art and to provide an oil or hydraulic leakage proof apparatus in a transfer feeder, which effectively prevent an oil from flowing down through an opening in the bottom wall of a cam box, which in turn prevents any portion of the oil from contaminating a workpiece or any part of the press machine and from hindering an operation thereof.

SUMMARY OF THE INVENTION

In order to achieve the above mentioned object, there is provided in accordance with the present invention a hydraulic leakage proof apparatus for a transfer feeder in which a cam box containing a cam and a lever adapted to be oscillated by the cam is placed on or above a press machine and is formed through its bottom with an elongate opening through which the lever may pass by a lower end side thereof, which apparatus comprises: a lower movable cover operatively coupled to the said lever and facing downwards so as to cover the said elongate opening while being displaced as the said lever is oscillated, the said lower movable cover having a lever through-going opening formed therein through which the said lever may pass; a cover member facing downwards so as to cover the said lever through-going opening; and a dam member arranged on the bottom of the said cam box and formed with a rising portion along an inner peripheral edge of the said elongate opening.

According to the construction described above, it can be seen and should be understood that by virtue of the fact that a said lower movable cover is provided facing downwards such as to cover the said elongate opening while being displaced along the same as the lever is oscillated, any portion of the lubricating oil supplied to such bearing parts of the lever and sliding parts of the cam, if allowed to fall down, is effectively prevented from leaking through the said elongate opening.

Also, since a said cover member, which is associated with a said lever, is arranged facing downwards so as to cover a said lever through-going opening which is formed in the said lever, any oil leakage whatsoever from the said lever through-going opening can effectively be prevented.

Also, a said dam member being provided having a rising portion serving to prevent a collection of the lubricating oil on the bottom of the cam box from leaking through the elongate opening, any possible hindrance to an operation of the press machine by a portion of the lubricating oil that may leak and any likewise possible contamination of a workpiece or a work site are effectively prevented.

In the construction noted above, further a guide means may be provided for guiding the displacement of the said lower movable cover.

According to this construction, it can be seen and should be appreciated that because of the ability for the said lower movable cover to move smoothly as the lever is oscillated, there should be no generation a noise or a vibration during the operation.

Also, a guide member may be mounted on an outer peripheral surface of the said lever so as to be sloped; and an upper movable cover may be mounted at a lower end side of said guide member and having one end side pivotally coupled to said lever and the other end side adapted to be moved over said lower movable cover.

According to the construction just mentioned, it can be seen and should be understood that with a portion of the lubricating oil that falls over the outer peripheral surface being first guided to the side of a said upper movable cover via the guide member and thereafter allowed to flown down on the bottom side of the cam box, the amount of oil that may fall directly onto the lower movable cover can be diminished, thereby keeping the lubricating oil from falling in an appreciable amount on the lower movable cover and thus rendering the system substantially completely hydraulic leakage free.

Further, in the apparatus noted the said lower movable cover may be of a collapsible structure deformable in a longitudinal direction of the said elongate opening.

In the construction just mentioned, the lower movable cover can be reduced in size with its length substantially equal to that of the elongate opening, thereby permitting the space of installation therefor to be minimized.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a hydraulic leakage proof apparatus for use in a transfer feeder are set forth with reference to the accompanying drawings hereof.

Figure 1:
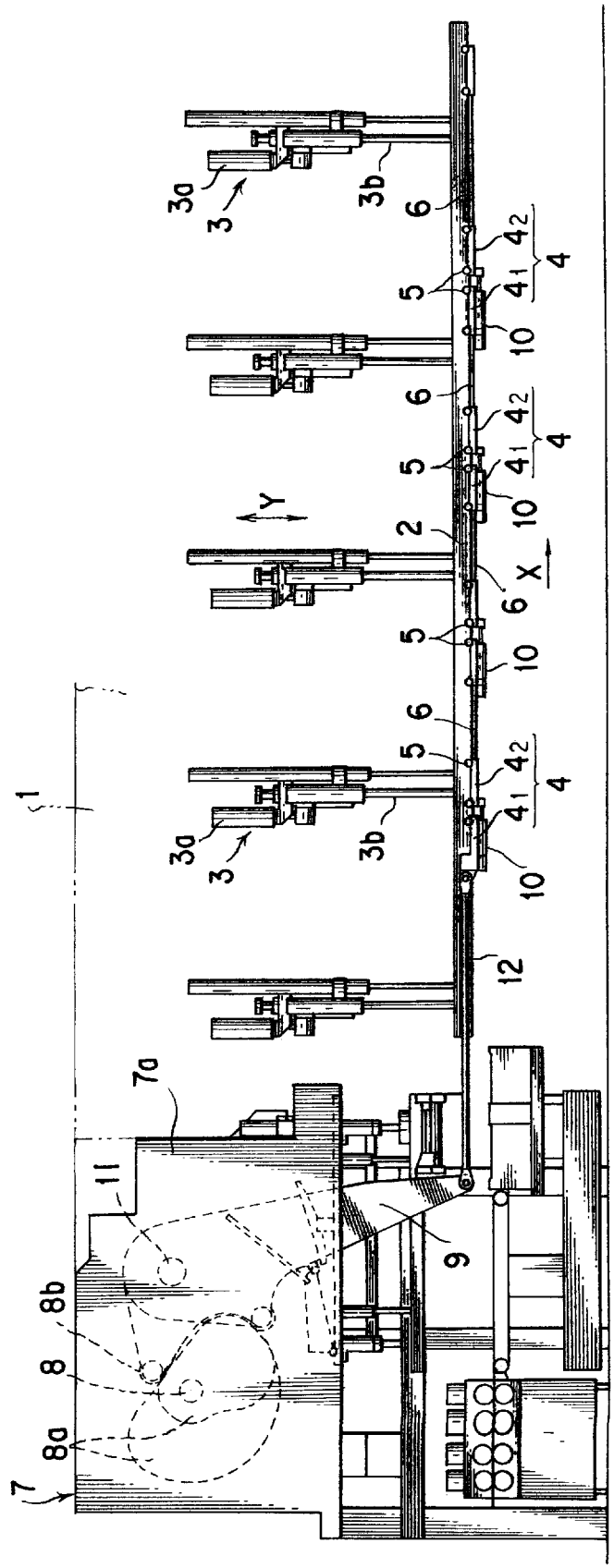
FIG. 1 is a front view illustrating a transfer press that is equipped with a certain embodiment of the hydraulic leakage proof apparatus constructed in accordance with the present invention.

A transfer feeder as shown in FIG. 1 is designed for use in a transfer press and for equipment in a press machine body 1 thereof. The feeder includes a pair of lift beams 2 which extend in a feed direction X that are adapted to be vertically displaced in a lift direction Y by a plurality of lift means 3 which are equally spaced apart from one another in the feed direction X.

Each of the lift means 3 includes a lift motor 3a that is constituted by a servo motor, where the lift motors 3a act to simultaneously displace a plurality of lifting rods 3b vertically in the lift direction Y. And, the lower end of each of the lifting rods 3b is coupled to the lift beam 2 so that the two parallel lift beams 2 may be displaced simultaneously as the lifting rods 3b are vertically displaced.

Each of the lift beams 2 has a plurality of cross bar carriers 4 supported thereof which are spaced apart from one another in the feed direction X.

Each of the cross bar carriers 4 comprises a principal carrier $4_1$ and a subsidiary carrier $4_2$ each of which has at its both ends a pair of upper and lower rollers 5 rotatably supported. A guide rail (not shown) is provided beneath each of the lift beams 2 extending over its length. With two such guide rails being arranged between the upper and lower rollers 5, the principal and subsidiary carriers $4_1$ and $4_2$ in each pair are suspended down the lift bars 2 so as to be displaceable in the feed directions X along the guide rails.

Two successive principal carriers $4_1$ are coupled together by a connecting rod 6 which is provided beneath the lift beams 2 so that they may be reciprocated in the feed direction X by a feed means 7 simultaneously. Also, the principal and subsidiary carriers $4_1$ and $4_2$ in each pair are coupled together by a shift means 10.

As shown in FIG. 1, the feed means 7 includes in an upstream site of the press machine body 1 a cam box 7a in which a cam shaft 8 is provided that is rotatable by a power taken from the press machine body 1 in synchronism with an operation thereof.

The cam shaft 8 is supported horizontally in a direction orthogonal to the feed direction X. And, the cam shaft 8 has a feed cam 8a coupled thereto which is constituted of a positive motion cam, with which in peripheral contact a cam follower 8b is arranged that is rotatably supported on a feed lever 9.

The feed lever 9 in its upper end side is supported on the cam box 7a by a supporting shaft 11 so that a rotation of the feed cam 8a may cause the lower end side of the feed lever 9 to oscillate in the feed direction X about the supporting shaft 11. Further, the lower end of the feed lever 9 and the principal carrier $4_1$ of the cross bar carrier 4 that is located at the most upstream side are coupled together by a link 12 so that an oscillation of the feed lever 9 may cause all of the cross bar carriers 4 to reciprocate in the feed direction X together in cadence.

On the other hand, the cam box 7a is formed in its bottom surface with an elongate opening 7b that extends in the feed direction X, through which the lower end side of the feed lever 9 is arranged to project downward And, above the elongate opening 7b there is provided a hydraulic leakage proof apparatus according to the present invention, which is designed to prevent a lubricating oil that has lubricated various bearing and sliding parts from leaking or running away from the cam box 7a.

Figure 2:
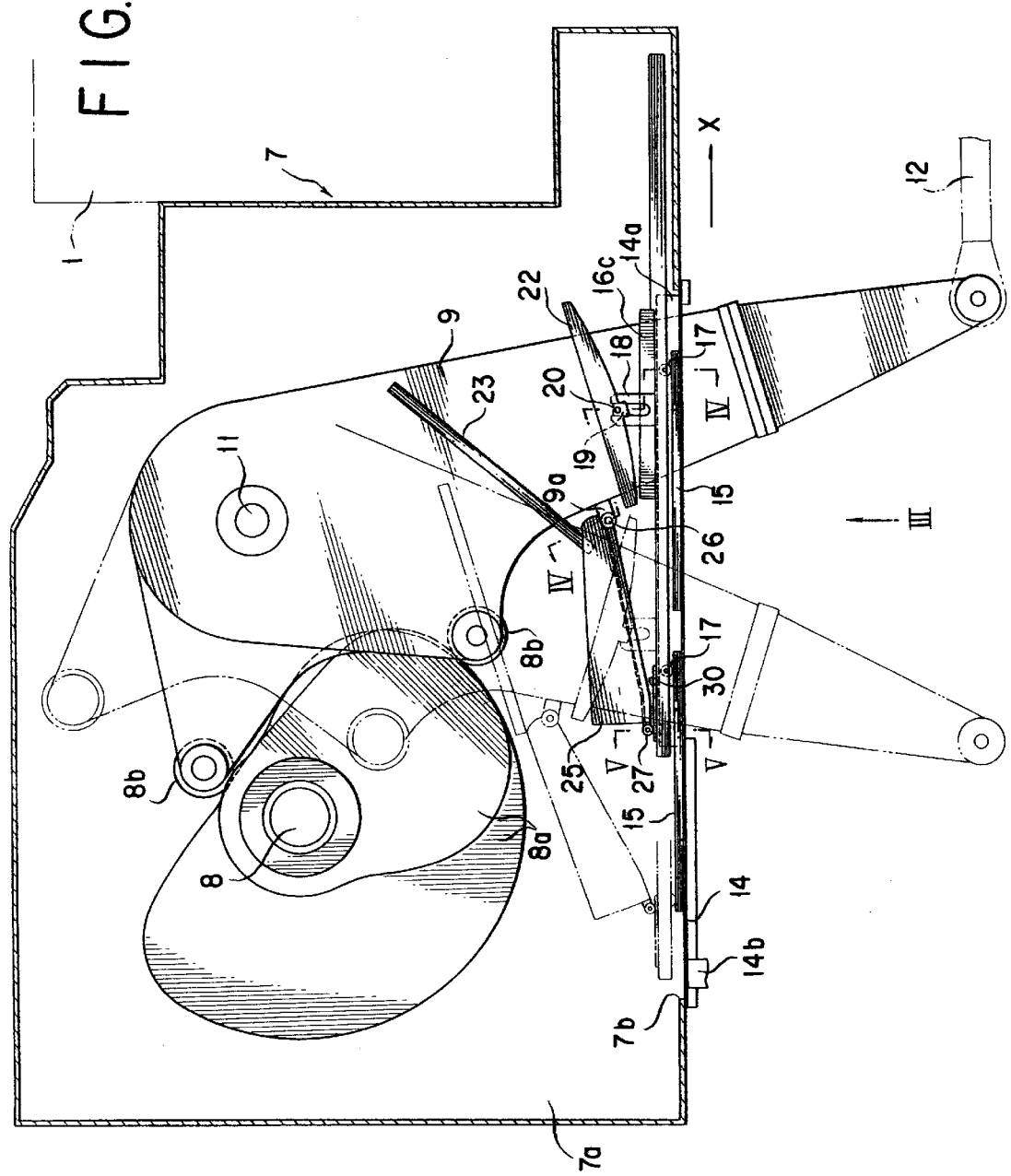
FIG. 2 is a cross sectional view of a feeder means that is provided in the hydraulic leakage proof apparatus in the illustrated embodiment of the present invention.
Figure 3:
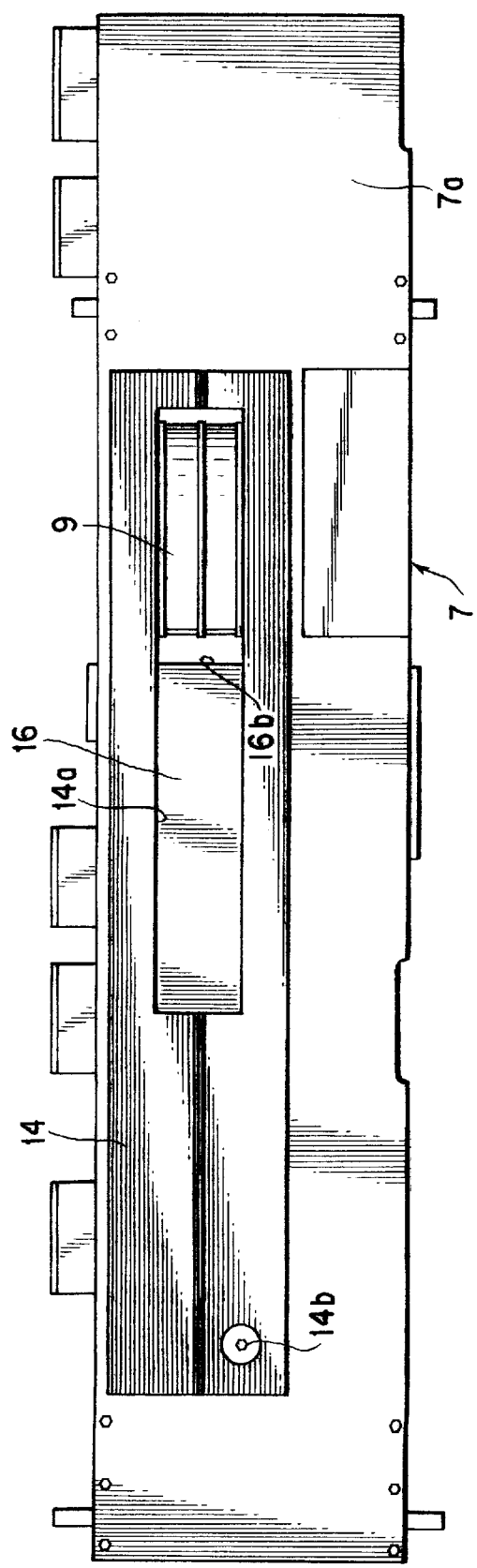
FIG. 3 is a plan view as seen according to the arrow III in FIG. 2.
Figure 4:
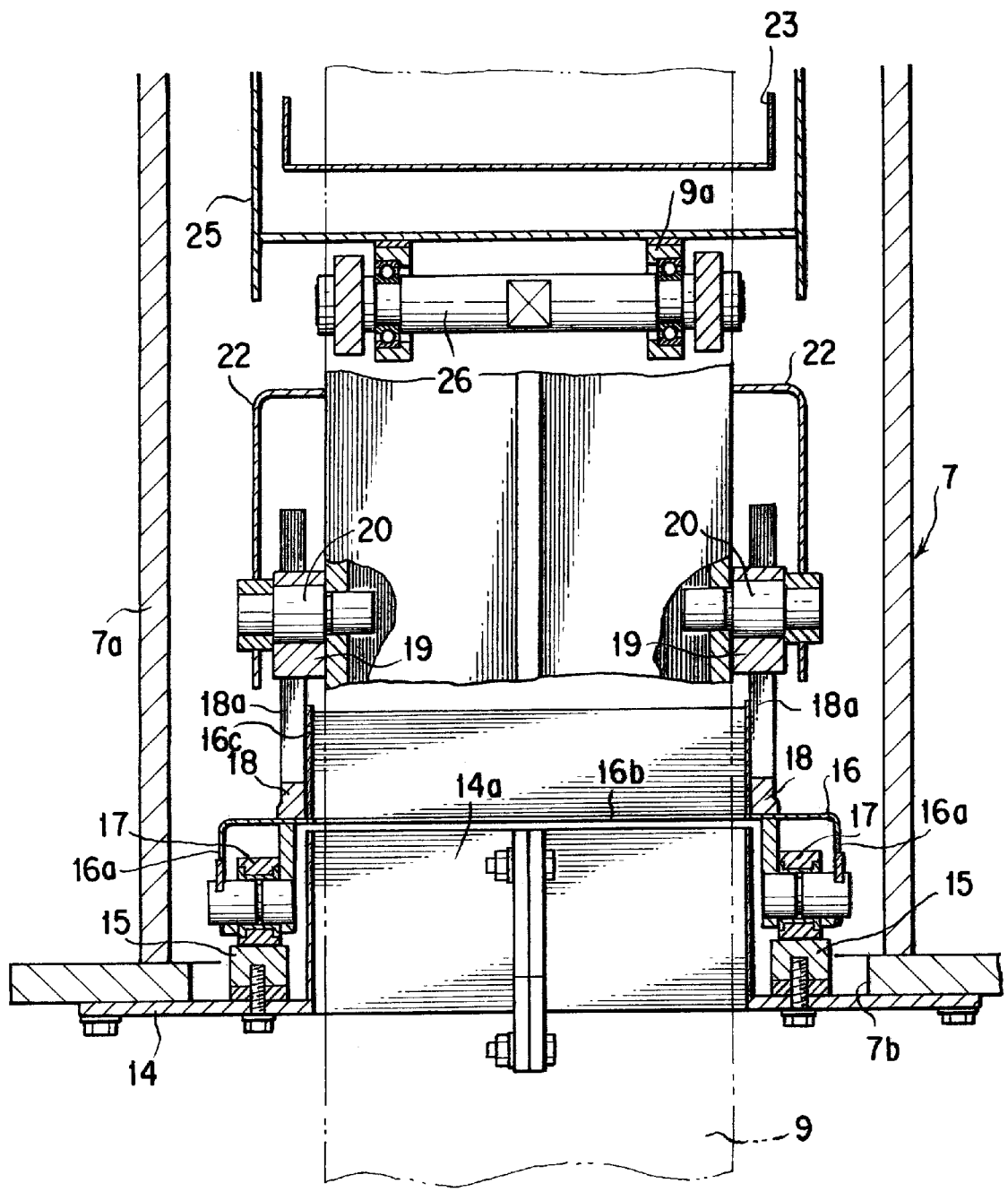
FIG. 4 is an enlarged cross sectional view taken along the line IV—IV in FIG. 2.

The hydraulic leakage proof apparatus, as is shown in FIGS. 2 to 4, includes a dam member 14 that is mounted on an under surface of the peripheral area of the elongate opening 7b which is formed through the bottom of the cam box 7a.

The gate plate 14 as shown in FIG. 3 is here in the form of a two part construction divided by a longitudinal center line and as shown in FIG. 4 as well is formed with a rising portion 14a which penetrates upward through the elongate opening 7b along the inner peripheral edge of the elongate opening 7b so that any lubricating oil which may collect in the cam box 7a may not leak out of the elongate opening 7b. Also, as shown in FIG. 3, the dam member 14 is formed in its bottom surface with an outlet opening 14b. Further, the base of the dam member 14 is provided above it with a guide means 15, here constituted of a pair of guide rails which are located at both sides of the rising portion 14a and extend parallel to the feed direction X. On this guide means 15 is arranged to rest a lower movable cover 16 via rollers 17.

The lower movable cover 16 is constituted of a plate which is approximately twice longer than the whole length of the elongate opening 7b and has both sides bent downwards. The rollers 17 are rotatably supported at one end side and midway of the bent portions 16a so that they may roll over the guide means 15 as the lower movable cover 16 is displaced.

Also, a pair of projections 18 are provided midway of the lower movable cover 16 in its longitudinal direction as rising on its both sides upwards.

Each of the two projections 18 are formed with a vertically elongated recess 18a for accepting a movable member 19 adapted to be slidably inserted therein vertically and thereby fitted therewith.

The movable member 19 has one end side rotatably supported by each of pins 20 and midway thereof, the pins 20 being secured to both side surfaces of the feed lever 9 so that an oscillation of the latter may cause the lower movable cover 16 to reciprocate in the feed direction X via the projections 18. Further, the other end side of each of the pins 20 is supported by a cover member 22 as will be described later.

The lower movable cover 16 is formed its midway with the above mentioned through-going opening 16b passing through the feed lever 9. A dam plate 16c is provided so as to surround the lever through-going opening 16b. At both sides of the feed lever 9 there stand a pair of cover members 22 as mentioned above having a cross sectional configuration in the form of a reversed "L" so as to cover upwards of the lever through-going opening 16b.

The dam plate 16c is designed to prevent the oil that may fall and collect on the surface of the lower movable cover 16 from flowing over the surface into the lever through-going opening 16. Also, the cover member 22 is dimensioned to be a bit longer than the lever through-going opening 16b and to have a lower edge configured to be a part of an arc which center is on the supporting shaft 11 so that covering upwards of the lever through-going opening 16b may prevent the lubricating oil that falls over the surface of the feed lever 9 from leaking through the lever through-going opening 16b.

Also, further upwards of the cover member 22 there is a guide member 23 that projects from each of both sides of the feed lever 9.

These guide members 23 are fastened obliquely to both side surfaces of the feed lever 9 to ensure that the oil which may have lubricated the shaft 11 supporting the feed lever 9 may be prevented from falling directly on the cover member 22 or falling on the lower movable cover 16 and that the lubricating oil that has flown along the slope of each of the guide members 23 may flow on the upper movable cover 25 coupled to the feed lever 9.

The upper movable cover 25 is located upwards of the lower movable cover 16 and is pivotally coupled through a pin 26 at one end side to a bracket 9a projecting from the feed lever 9.

Figure 5:
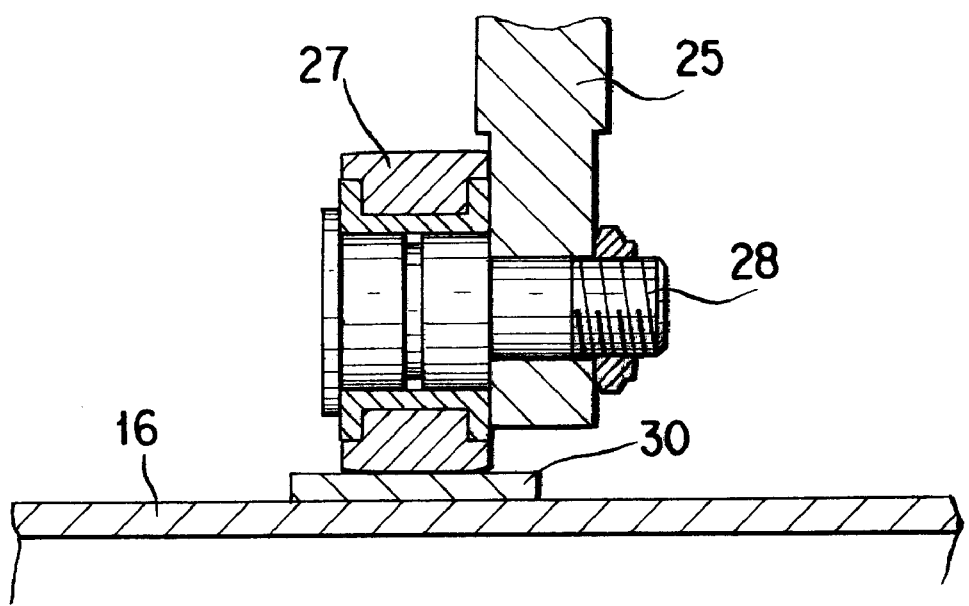
FIG. 5 is an enlarged cross sectional view taken along the line V—V in FIG. 2.

Also, the upper movable cover 25 has both sides bent upwards so that the lubricating oil that has fallen from the guide member 23 may not spill over both its sides. And, as shown in FIG. 5, at the other end side of the upper movable cover 25 and in its lower part a roller 27 is rotatably supported by a shaft 28 so as capable of rolling over a rail 30 formed on the upper surface of the lower movable cover 16.

The hydraulic leakage proof apparatus with the construction so far described operates in a manner as set forth below.

In an operation of the press machine 1, the feed cam 8a is rotated by a power taken from the press machine 1 to cause the lower end of the feed lever 9 to reciprocate in the feed direction X. This causes all the cross bar carriers 4 supported by the lift beam 2 to reciprocate in the feed direction X and at the same time the lift beams 2 to be vertically displaced in the lift direction Y by the lift means 3.

It follows therefore that each pair of cross bar carriers 4 which are transversely arranged in tandem (not shown) is operable to move two-dimensionally both along the feed direction X and along the lift direction Y so that a workpiece (not shown) held by a suction means which each cross bar carrier pair 4 carries may be transferred from one work station to another in succession so as to be pressed and thereby formed sequentially.

Also, while the press machine is operated, a lubricating system furnishes a lubricating oil or hydraulic into various bearing or sliding parts in the cam box 7a, thereby lubricating these parts. The oil and hydraulic that has lubricated the parts such as the bearing or sliding surfaces of the feed cam 8a and the shaft 11 supporting the feed lever 9, while falling over the surface of the feed lever 9, is led by the guide member 23 to the side of the upper movable cover 25, then arriving on the bottom region of the cam box 7a after passing over the upper movable cover 25.

The lubricating oil of which a portion is allowed to flow downwards of the guide member 23 will effectively be prevented from leaking out of the cam box 7a through the elongated opening 7b formed through the bottom of the cam box 7a or the lever through-going opening 16b formed through the lower movable cover 16, by virtue of the fact that downwards of the guide member 23 there are arranged both the lower movable cover 16 as covering the elongated opening 7b and the cover member as covering the lever through-going opening 16b.

Also, while it is possible that a portion of the lubricating oil may fall directly on a surface of the lower movable cover 16 which is not covered by the cover member 22, then the dam plate 16c acts to prevent the oil from flowing over that surface into the lever through-going opening 16b.

It should further be noted that should the lower end side of feed lever 9 be oscillated about the supporting shaft 11 in the feed direction X, then the lower movable cover 16 will be allowed, via the projections 18 engaging with the movable elements 19, to reciprocate correspondingly in the feed direction X, within the positional range indicated by the solid line shifting to the phantom line in FIG. 2.

It can therefore be seen that should the feed lever 9 be oscillated, the lower movable cover 16 will be kept to always cover above the elongated opening 7b, thereby acting to prevent a portion of the lubricating oil that may fall there from leaking through the elongated opening 7b without fail.

Then, the upper movable cover 25 will simultaneously be reciprocated as well, in the positional range indicated by the solid line shifting to the phantom line in FIG. 2, thus permitting a portion of the lubricating oil that tends to flow down over the guide member 23 sloped to be directed onto the bottom of the cam box 7a.

The portion of lubricating oil that is caught on the bottom of the cam box 7a can once be returned from the outlet opening 14b formed through the bottom of the gate plate 14 to the lubricating system in the press machine 1 via a pipe arrangement not shown, and can thereafter be furnished from the lubricating system to the various bearing or sliding parts in the cam box 7a.

It should be noted that while in the embodiment described in the foregoing the lower movable cover 16 is shown as formed of a plate that is about twice longer than the elongated opening 7b, the same when formed of a collapsible construction such as in the form of a bellows may be sized to be approximately the same in length as the elongated opening 7b.

It should also be noted that while the present invention has been described in the foregoing in connection with an embodiment thereof that is carried out in the cam box 7a for the feed means 7 in a transfer feeder, it can be applicable to any other form of the transfer feeder, either two- or three-dimensional, in which for example, a cam mechanism is employed for the lift means or clamp means, where or the cam box is placed on or above the press machine body 1.

While the present invention has hereinbefore been thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all the equivalents thereof.

What is claimed is:

1. A hydraulic leakage proof apparatus for a transfer feeder in which a cam box containing a cam and a lever adapted to be oscillated by the cam is placed on or above a press machine and is formed through its bottom with an elongate opening through which the lever may pass by a lower end side thereof, the apparatus comprising:

a lower movable cover operatively coupled to said lever and facing downwards so as to cover said elongate opening while being displaced as said lever is oscillated, said lower movable cover having a lever through-going opening formed therein through which said lever may pass;

a cover member facing downwards so as to cover said lever through-going opening; and a dam member arranged on the bottom of said cam box and formed with a rising portion along an inner peripheral edge of said elongate opening.

2. A hydraulic leakage proof apparatus as set forth in claim 1, further comprising a guide means for guiding the displacement of said lower movable cover.

3. A hydraulic leakage proof apparatus as set forth in claim 1, further comprising:

a guide member mounted on an outer peripheral surface of said lever so as to be sloped; and an upper movable cover mounted at a lower end side of said guide member and having one end side pivotally coupled to said lever and the other end side adapted to be moved over said lower movable cover.

4. A hydraulic leakage proof apparatus as set forth in claim 1, in which said lower movable cover is of a collapsible structure deformable in a longitudinal direction of said elongate opening.

* * * * *